C. W. MILES.
MACHINE TOOL.
APPLICATION FILED MAY 15, 1905.

969,388.

Patented Sept. 6, 1910.

2 SHEETS—SHEET 1.

Witnesses
A. McCormack.
Walter F. Murray

Inventor
Casper W. Miles

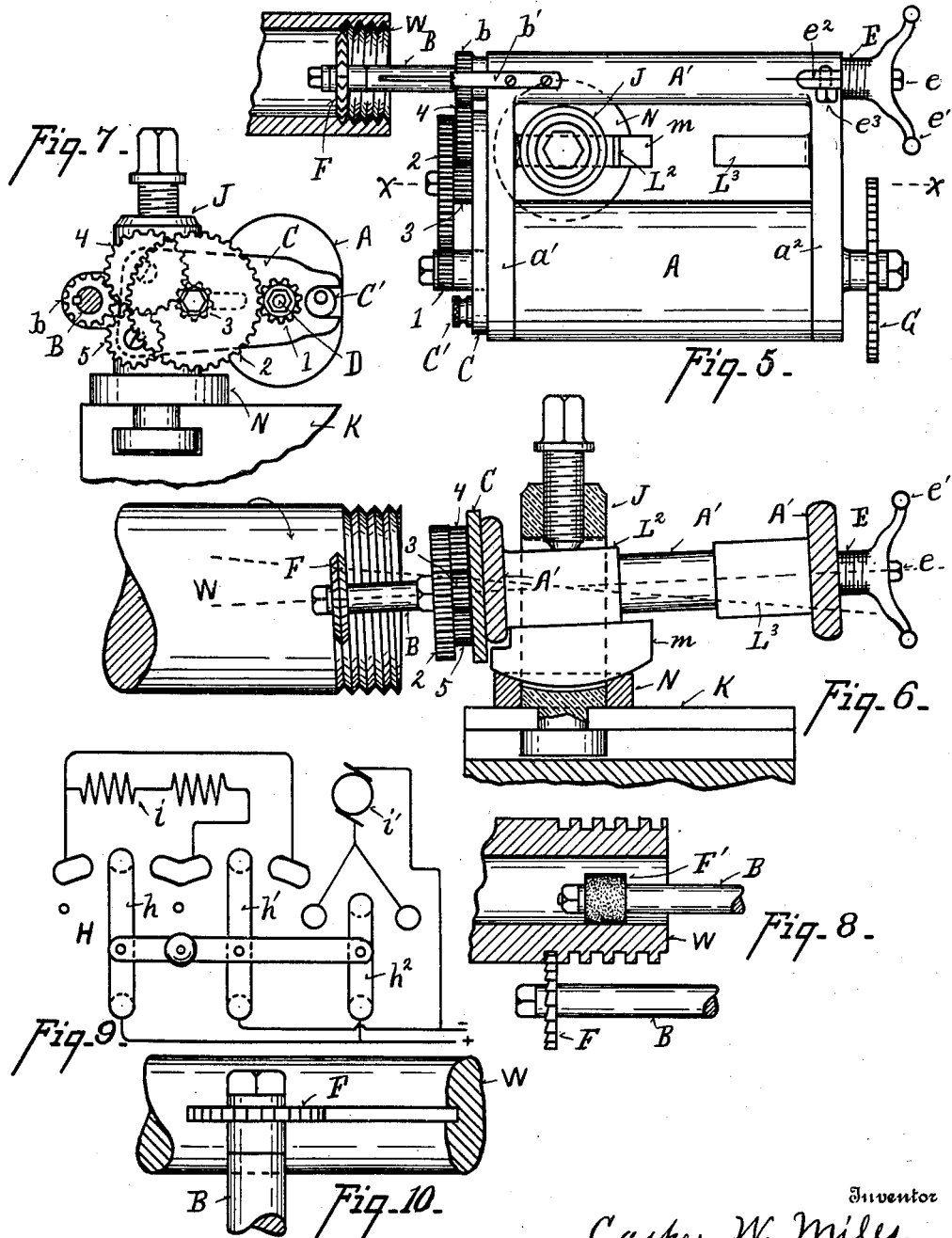

UNITED STATES PATENT OFFICE.

CASPER W. MILES, OF CINCINNATI, OHIO.

MACHINE-TOOL.

969,388.  Specification of Letters Patent.  Patented Sept. 6, 1910.

Application filed May 15, 1905. Serial No. 260,417.

*To all whom it may concern:*

Be it known that I, CASPER W. MILES, a citizen of the United States, residing at Cincinnati, in the county of Hamilton and State of Ohio, have invented certain new and useful Improvements in Machine-Tools, of which the following is a specification.

My invention relates to improved machine tools for attachment to the tool carriage of lathes, planers, shapers, etc. One of its objects is to provide an improved tool for cutting internal and external screw threads.

Another object is to provide an improved tool for grinding various parts of the work.

Another object is to provide a tool having a maximum range of adjustment in order to treat objects of large as well as small diameter, and to treat both the center and circumference of large articles.

Another object is to provide a tool adapted to thread or grind the bore of cylindrical articles.

Another object is to provide a tool having improved means of adjustment whereby work heretofore accomplished with difficulty may be readily performed.

Figure 1:
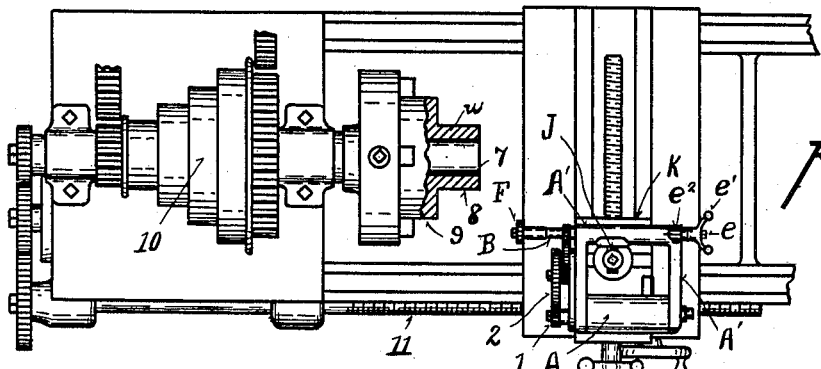
Figure 3:
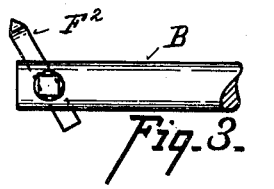
Figure 4:
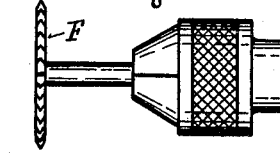
Figure 2:
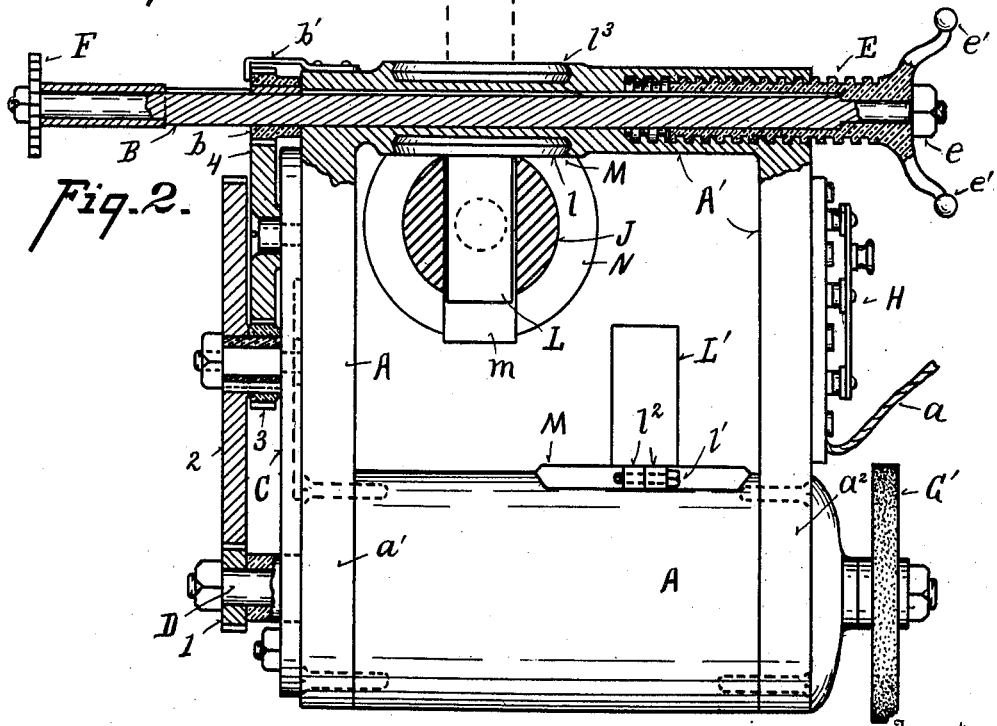

It further consists in certain details of form, combination and arrangement, all of which will be more fully set forth in the description of the accompanying drawings in which:

Figure 1 is a top plan view of a lathe with one of my improved tools in position on the tool carriage ready for use. Fig. 2 is an enlarged top plan view partially in section of the tool attached. Figs. 3 and 4 are details illustrating different tools attached to the tool shaft. Fig. 5 is a top plan view of a modified form of the tool. Fig. 6 is a section on line $x$—$x$ of Fig. 5 illustrating the manner of effecting the angular adjustment. Fig. 7 is a plan view of the transmitting and reversing gearing. Fig. 8 is a detail view of the manner of applying the tool to the interior and exterior of the work. Fig. 9 is a plan view of the motor starting, stopping and reversing switch. Fig. 10 illustrates the application of the tool for cutting slots or key seats.

In Fig. 1 I have illustrated the tool applied to a lathe in which 10 represents the headstock rotating the work $w$, and in which the tool carriage K is fed by the lead screw 11 along the ways at a predetermined rate in unison with the movements of the headstock.

Referring to my improved tool, A represents a motor, preferably electrically operated and supplied with current through a flexible cord $a$.

A' represents a yoke frame attached to or formed integral with the heads $a'$ $a^2$ of the motor.

B represents the tool shaft journaled in yoke A' preferably parallel with the motor shaft, and receiving motion therefrom through a train of gears 1, 2, 3, 4, 5. The gears 2, 3, 4, 5, are carried by a plate C which can be adjusted about the center of the motor shaft D so as to bring either gear 4 or 5 into engagement with the gear $b$ on the shaft B, which thereby reverses the direction of rotation of the shaft B, which is desirable in changing from internal to external surfaces of the work, such as cutting internal and external threads.

C' represents an eccentric collar on the stud $c$ which is preferably employed for quickly and conveniently shifting the plate C.

The gear $b$ is preferably splined to shaft B and held in place relative to the yoke A' and gears 4 and 5 by a bracket $b'$, so that the shaft B may be adjusted endwise relative to the yoke. This endwise adjustment is effected by means of a sleeve E screw threaded into the yoke and to which the end of shaft B is journaled and locked by nut $e$. The wings $e'$ enable the sleeve to be screwed into and out of the yoke to adjust shaft B endwise, and when turned into a vertical plane are not liable to contact with the work. The yoke is split at $e^2$ and can be clamped upon the sleeve E by bolt $e^3$ to lock the sleeve to its adjusted position.

A variety of tools such as rotary cutters F, abrasive or grinding wheels F', cutting tools F$^2$ are adapted to be interchangeably attached to the end of shaft B, depending upon the work to be performed. Rotary cutters and abrasive wheels G G' may also be attached to the motor shaft and the position of the tool reversed to bring the motor between the work and tool post when desired. When the tool on the motor shaft is to be used, its periphery must extend beyond the edge of the motor, otherwise the work will contact with the motor, when the shaft B is used however, a tool of small diameter may be used without liability of contact between the work and yoke A', thus the range of adjustment using the shaft B is much greater than when using the motor shaft direct, also the speed of shaft B may be regulated within a wider range than the speed of the motor shaft.

H represents the motor switch consisting of contact arms $h$ $h'$ which serve to connect the field $i$ in circuit and to reverse the direction of the current therein, while the arm $h^2$ connects the current through the armature $i'$. Contact through the field is effected before contact through the armature is effected in order to prevent unnecessary sparking in the motor. Thus by shifting the switch arms to the left the motor is driven in one direction, and its direction is reversed by shifting the arms to contact position in the opposite direction. The direction of rotation of the tool may thus be shifted either mechanically by means of the gears or by the motor switch as desired.

Gears 2, 3, 4, and 5 are adapted to be detached from plate C and replaced by gears of different diameters to change the relative speed of the motor and tool shafts to suit different characters of work.

The tool is preferably attached to the usual tool post J of the tool carriage K of a planer, lathe shaper or other machine. As shown in Figs. 1 and 2 bars L L' are provided to be clamped in the tool holder or post in place of the usual tool. These bars L L' are provided with disks $l$ which seat and are clamped in recesses M by means of screws $l'$ passing through lugs $l^2$, by which means the motor and tool shafts may be adjusted to any desired angle in vertical plane relative to the bar held in the tool post. The bar L may also be clamped in recess $l^3$ in front of the shaft B if desired to secure greater range of adjustment. The bar L' is provided attached to the motor for use when the tool is reversed to bring tools on the motor shaft into use.

In the modification Figs. 5 and 6 the posts $L^2$ $L^3$ are attached directly to the yoke, and the motor and tool shaft adjusted in a vertical plane by means of a semi-circular bolster $m$ beneath the bar $L^2$ seating on the upper concave face of ring N, which bolster can be shifted to attain the angular adjustment desired. For cutting screws, particularly of coarse pitch it becomes desirable and important to adjust the tool so that the cutter wheel will approximately correspond with the angle described by the thread as indicated in Fig. 6.

The usual practice in cutting threads heretofore has been to cause the ordinary lathe tool to retrace or " chase " the thread a number of times until the spiral groove has been cut to the desired depth, which operation can only be successfully done by thoroughly skilled mechanics. With my improved tool the thread can be cut on any ordinary engine lathe and requires to be traversed but once, resulting in a smooth accurate finished operation, which can be successfully performed by any ordinary mechanic, and with a considerable saving of time and labor. While the said tool is particularly adapted to cutting of threads, which may be cut or extended close to shoulders or bolt heads, by using a cutter such as shown in Fig. 4, in which there is no projecting part beyond the cutter wheel, if required.

It will be noted that by placing the tool shaft B close to the tool post a firm support therefor is obtained, also a small wheel may be employed thereon, and thus the tool may be adjusted not only to work close to the axis of rotation of the work, but also on the exterior of work of large diameter, thus in Fig. 1 the tool may be adjusted by the carriage cross feed screw into position to treat either surface 7, 8, or 9 as desired.

I have shown the tool adapted to be held in the tool post ordinarily employed, but it may if desired be otherwise clamped to the tool carriage. I have also shown the motor in the same horizontal plane as the tool shaft B, it may however be in a vertical or other plane relative to the tool shaft. It is obvious that the tool may be adjusted in the tool holder horizontally to any desired angle relative to the tool carriage.

The mechanism herein specified is capable of considerable modification without departing from the principle of my invention.

Having described my invention, what I claim is;

1. In combination with a machine having a work holding and rotating member, and a tool holder adapted to be moved in ways at a prescribed rate in unison with the movements of the work, a tool adapted to be carried by said tool holder consisting of an independent motor, a metallic rotary toothed cutter, and means for reversing the direction of rotation of said cutter.

2. In combination with a machine tool holder, a tool adapted to be attached thereto, consisting of an independent motor, a shaft adapted to carry rotating tools mounted in bearings parallel with the motor shaft and adapted to receive motion therefrom.

3. In combination with a machine tool holder, a tool adapted to be attached thereto, consisting of an independently driven motor, a tool shaft adapted to carry rotating tools journaled in fixed relations to the motor, transmitting mechanism to impart motion from the motor to said tool shaft, and means for rigidly securing said tool to the tool holder.

4. In combination with a machine tool holder, a tool adapted to be attached thereto, consisting of an independently driven motor, a tool shaft adapted to carry rotating tools journaled in fixed relations to the motor, transmitting mechanism to impart motion from the motor to said tool shaft, and means for reversing the direction of rotation of said tool shaft.

5. In combination with a power driven machine tool carriage, a thread milling attachment adapted to be carried by said tool carriage comprising a tool shaft, a milling cutter mounted on said shaft, an independent motor connected to and adapted to rotate said tool shaft, and means for securing said attachment to the tool carriage.

6. In combination with a power driven tool carriage, a thread cutting tool carried thereby comprising a frame adapted to be attached to said carriage, an independent motor carried by said frame, a tool shaft journaled in fixed relations to said motor, a rotary cutter carried by said shaft and means for attaching said tool to the tool carriage and adjusting it relative to said carriage to bring the rotary cutter to the angle of the thread to be cut.

7. In combination with a machine having a work holding and rotating member and a tool carriage moving in ways at a prescribed rate in unison with the movements of the work, a thread cutting tool detachably connected to said carriage and comprising a frame, an independent motor carried thereby, a rotary shaft journaled to said frame, a milling cutter carried by said shaft, and means for adjusting said cutter to varying angles relative to the tool carriage to correspond with the angle of the thread to be cut.

8. In combination with a machine tool holder, a tool adapted to be attached thereto, consisting of a frame adapted to be attached to the tool holder, an independent motor carried by said frame, a tool shaft journaled in fixed relations to the motor, mechanism for imparting motion from the motor to the tool shaft, a rotary tool carried by said shaft, and means for feeding said tool shaft endwise relative to said frame and clamping it to varying points of adjustment.

9. In a tool adapted to be attached to a machine tool holder, an independent motor, a tool shaft journaled in the motor frame at one side thereof and parallel with the motor shaft, mechanism for transmitting motion from the motor to said tool shaft, a rotary tool carried by said shaft, and means located between the motor and tool shaft for attaching said tool to the tool holder.

10. In a tool adapted to be attached to a machine tool holder, an independent motor, a yoke frame attached at opposite ends to said motor, a tool shaft journaled in said frame, mechanism for imparting motion from the motor to the tool shaft, and means located within the yoke frame for attaching the tool to the tool holder.

11. In a tool adapted to be attached to a machine tool holder, an independent motor, a yoke frame attached at opposite ends to said motor, a tool shaft journaled in said frame, mechanism for imparting motion from the motor to the tool shaft, and means for attaching the tool to the tool holder with the tool post interposed between the tool shaft and motor.

In testimony whereof I have affixed my signature in presence of two witnesses.

CASPER W. MILES.

Witnesses:
A. McCormack,
C. B. Hoy.